(12) United States Patent
Kellar et al.

(10) Patent No.: US 8,616,772 B1
(45) Date of Patent: Dec. 31, 2013

(54) CONFORMAL WEAR-RESISTANT BEARING ASSEMBLY

(71) Applicants: Franz W. Kellar, Gastonia, NC (US); Harold Lloyd Crowder, Jr., Concord, NC (US); Scott M. Duquette, Clemmons, NC (US)

(72) Inventors: Franz W. Kellar, Gastonia, NC (US); Harold Lloyd Crowder, Jr., Concord, NC (US); Scott M. Duquette, Clemmons, NC (US)

(73) Assignee: Little Engine, LLC, Gastonia, NC (US)

( * ) Notice: Subject to any disclaimer, the term of this patent is extended or adjusted under 35 U.S.C. 154(b) by 0 days.

(21) Appl. No.: 13/969,426

(22) Filed: Aug. 16, 2013

Related U.S. Application Data (60) Provisional application No. 61/801,245, filed on Mar. 15, 2013.

(51) Int. Cl.
*F16C 17/00* (2006.01)
*F16C 27/00* (2006.01)

(52) U.S. Cl.
USPC .............. 384/129; 384/10; 384/215; 384/276

(58) Field of Classification Search
USPC ........... 384/95, 103, 104, 106, 114, 129, 215, 384/280, 281, 10, 26, 37, 38, 42, 97, 98, 384/276, 282
See application file for complete search history.

(56) References Cited

U.S. PATENT DOCUMENTS

| | | |
|---|---|---|
| 1,122,565 A | 12/1914 | Bache |
| 1,153,647 A | 9/1915 | Smalley |
| 1,384,173 A | 7/1921 | Wikander |
| 3,157,444 A | 11/1964 | Scheel |
| 3,161,449 A | 12/1964 | Flom |
| 3,168,320 A | 2/1965 | Sneed |
| 3,449,024 A | 6/1969 | Llchte |
| 3,484,143 A | 12/1969 | Tallian et al. |
| 3,517,973 A | 6/1970 | Hirs |
| 4,385,787 A | 5/1983 | Reisenweber et al. |
| 4,415,281 A | 11/1983 | Agrawal |
| 4,820,950 A | 4/1989 | Hijiya et al. |
| 5,054,939 A | 10/1991 | Adolfsson |
| 5,505,545 A | 4/1996 | Mergler |
| 5,516,213 A | 5/1996 | Moriyama et al. |
| 5,871,285 A | 2/1999 | Wasson |
| 5,908,247 A | 6/1999 | Leuthold et al. |
| 5,941,646 A | 8/1999 | Mori et al. |
| 6,000,850 A | 12/1999 | Takahashi et al. |
| 6,113,275 A | 9/2000 | Blase |
| 6,450,688 B2 | 9/2002 | Matsushima |

(Continued)

FOREIGN PATENT DOCUMENTS

| | | |
|---|---|---|
| DE | 3704572 | 8/1988 |
| DE | 3833556 | 5/1989 |

(Continued)

*Primary Examiner* — Phillip A Johnson
(74) *Attorney, Agent, or Firm* — Trego, Hines & Ladenheim, PLLC (57) ABSTRACT

Bearing apparatus includes: (a) a first member comprising rigid material and having a bore defining a first contact surface; (b) a second member disposed in the bore, the second member comprising rigid material and having a cylindrical surface defining a second contact surface; (c) wherein both contact surfaces are wear-resistant, and wherein the first and second members are positioned relative to each other by a plurality of protruding bearing elements contacting at least one of the first and second contact surfaces, so as to transfer mechanical loads between the members, each bearing element including a raised central portion flanked by a pair of beam portions, while allowing relative translation and/or rotation between the members; and (e) wherein the bearing elements are shaped and sized so as to deform elastically and conform in an irregular shape to the at least one contact surface.

11 Claims, 11 Drawing Sheets

(56) References Cited

U.S. PATENT DOCUMENTS

| | | |
|---|---|---|
| 6,502,989 B1 | 1/2003 | Takeuchi et al. |
| 6,870,289 B1 | 3/2005 | Otsuki et al. |
| 7,527,431 B2 | 5/2009 | Kakinuma et al. |
| 7,687,951 B2 | 3/2010 | Komori |
| 8,240,917 B2 | 8/2012 | Engesser et al. |
| 2005/0066525 A1 | 3/2005 | Sato et al. |
| 2006/0002640 A1 | 1/2006 | Chen et al. |
| 2008/0212908 A1 | 9/2008 | Mori et al. |
| 2011/0166671 A1 | 7/2011 | Kellar et al. |

FOREIGN PATENT DOCUMENTS

| | | |
|---|---|---|
| EP | 0601624 | 9/1996 |
| EP | 1068921 | 1/2001 |
| EP | 1961980 | 9/2009 |
| EP | 2343462 | 7/2011 |
| FR | 2611008 | 8/1988 |
| GB | 847240 | 9/1960 |
| JP | 55135227 | 10/1980 |
| JP | 5877917 | 5/1983 |
| JP | 6152414 | 3/1986 |
| TW | 500834 | 7/1999 |

CONFORMAL WEAR-RESISTANT BEARING ASSEMBLY

BACKGROUND OF THE INVENTION

This invention relates generally to bearings, and more particularly to bearings for use between two components which move relative to each other.

Numerous types of mechanical assemblies require bearings to provide low-friction contact between two components. Numerous types of bearings are known, such as plain bushings, hydrodynamic and hydrostatic bearings, and rolling element bearings.

For some applications it is desirable to employ a plain bearing or bushing design using exclusively "hard" materials (e.g. metals or ceramics). These materials are suitable for harsh industrial environments including for example high temperatures or pressures, or caustic or corrosive fluids.

Sliding bearing assemblies using two hard elements of conventional design will be, however, subject to rapid wear. First, a bearing having one hard, rigid element on another will not be perfectly shaped to a nominal geometry. Such imperfections will result in points of high stress, thus causing localized wear. Furthermore, two hard elements would lack the resilient nature of "soft" materials.

BRIEF SUMMARY OF THE INVENTION

These and other shortcomings of the prior art are addressed by the present invention, which provides a bearing configuration having wear-resistant contacting surfaces with conformal properties.

According to one aspect of the invention, a bearing apparatus, includes: (a) a first member comprising a rigid material and having an internal bore defining a first contact surface; (b) a second member disposed in the internal bore of the first member, the second member comprising a rigid material and having an outer cylindrical surface defining a second contact surface; (c) wherein contact surfaces are wear-resistant, and wherein the first and second members are positioned relative to each other by a plurality of protruding bearing elements contacting at least one of the first and second contact surfaces, so as to transfer mechanical loads between the first and second members, while allowing relative translation and/or rotation between the first and second members, wherein each bearing element includes a raised central portion flanked by a pair of beam portions; and (e) wherein the bearing elements are shaped and sized so as to deform elastically and conform in a regular or irregular shape to the at least one contact surface.

According to another aspect of the invention, a bearing apparatus includes: (a) an inner member comprising a rigid material and defining a first contact surface; (b) an outer member comprising a rigid material and defining a second contact surface; (c) an annular intermediate member disposed between the inner and outer members, the intermediate member having: (i) a third contact surface including a plurality of protruding first bearing elements contacting the first contact surface of the inner member to define a first bearing interface that transfers mechanical loads between the inner and intermediate members, while allowing relative translation and/or rotation therebetween, wherein each first bearing element includes a raised central portion flanked by a pair of beam portions; and (ii) a fourth contact surface including a plurality of protruding second bearing elements contacting the second contact surface of the outer member to define a second bearing interface that transfers mechanical loads between the outer and intermediate members, while allowing relative translation and/or rotation therebetween, wherein each second bearing element includes a raised central portion flanked by a pair of beam portions; (d) wherein the contact surfaces of each bearing interface are wear-resistant; and (e) wherein the bearing elements are shaped and sized so as to deform elastically and conform in an irregular shape to the at least one contact surface.

BRIEF DESCRIPTION OF THE DRAWINGS

The invention may be best understood by reference to the following description taken in conjunction with the accompanying drawing figures in which.

DETAILED DESCRIPTION OF THE INVENTION

In general, the present invention is a bearing assembly for two concentric members of a machine or mechanical assembly which can move relative to each other (e.g. relative rotation or translation). As an example, the invention could be used between a bore in a housing of an industrial valve and the shaft or stem of the valve (where the valve stem can rotate and/or translate relative to the housing.) As will be explained further, the bearing may be a separate component, or parts of the bearing may be integral to one or both of the contacting members. Furthermore, the bearing described herein may be used directly between two machine elements, or the assembly described herein (using two member with a bearing between them) may be used as a self-contained bearing within a larger assembly or device.

The present invention provides a unique bearing element configuration. Generally, the bearing element is flexible enough to allow elastic deformation and avoid localized load increases, but not so flexible as to risk plastic deformation, cracking and failure. In particular, the bearing element is designed such that the stress levels therein will be below the high-cycle fatigue endurance limit. As an example, the bearing element might be only about 10% to about 20% as stiff as a comparable solid member. It is also possible to construct the bearing element geometry with a variable stiffness, i.e. having a low effective spring rate for small deflections and a higher rate as the deflections increase, to avoid failure under sudden heavy loads.

As a general principle, the bearing assembly of the present invention includes two mechanical members which require movement therebetween. A bearing is provided, which may be a separate component or integral to one of the members. The bearing includes a wear-resistant contact surface that bears against the opposing contact surface. The structure of the bearing element is conformal.

The bearing configuration generally includes a protruding bearing element which is part of a contact surface. The bearing element is constructed from a rigid material. As used here, the term "rigid" refers to a material which has a high stiffness or modulus of elasticity. Nonlimiting examples of rigid materials having appropriate stiffness for the purpose of the present invention include stainless steels, cobalt-chrome alloys, titanium, aluminum, and ceramics. By way of further example, materials such as polymers and elastomers would generally not be considered "rigid" for the purposes of the present invention. Generally, a rigid material should have a modulus of elasticity of about $0.5 \times 10^6$ psi or greater. The contact surface is wear-resistant. As used herein, the term "wear-resistant" refers to a surface which is resistant to surface material loss when placed under load and has relative motion to another surface. Generally the wear coefficient of the wear-resistant contact surface should be lower than 1.0e-5 $mm^3$/N-m (that is, $1 \times 10^{-5}$ cubic millimeters per Newton-meter). Nonlimiting examples of wear-resistant materials include known coatings such as STELLITE, tungsten carbide, titanium nitride, chrome plating, carbon thin films, and/or diamond-like carbon coatings. Such materials may be used as a face layer, coating, or film to impart the wear-resistant characteristic to the contact surface of the bearing element. Such materials are referred to generally herein as "wear-resistant coatings." Optionally, the contact surface of the bearing element could comprise a substantially thicker face layer of a wear-resistant material such as ultra-high molecular weight polyethylene (UHMW-PE) or polyether ether ketone ("PEEK").

Nominally the two mating contact surfaces (i.e. bearing element and opposing surface) define a contact interface therebetween. In practice it is impossible to achieve surface profiles completely free of minor imperfections and variations. If the bearing element and the opposing member were both completely rigid, this would cause high Hertzian contact stresses and rapid wear. Accordingly, an important principle of the present invention is that the bearing element and thus the associated contact surface is conformable to the opposing contact surface. (The terms "conformable" and "conformal" may be used interchangeably herein).

As noted above, it is impossible in practice for either of the contact surfaces to be perfect surfaces (i.e. a perfect plane, sphere, or other curve or collection of curves). It is believed that in most cases that a such as a protrusion from the nominal contact surface of just 0.00127 mm (0.00005 in.), that is, 50 millionths of an inch, or larger, would be sufficient to cause fretting corrosion and failure of a metal-on-metal joint constructed to prior art standards. A defect may include a variance from a nominal surface shape as well as a discontinuity in the contact surface. Defects may arise through a variety of sources such as manufacturing, installation, and/or operating loads in the bearing assembly. A bearing having a prior art configuration and made from rigid material cannot conform to such defects through elastic deformation, and has a tendency to "bridge" across them instead.

Following the principles of the present invention, the bearing element can conform to the imperfect opposing contact surface and deflect in an irregular shape. In other words, in addition to any uniform deflection which may be present, the deflected shape of the bearing element can include one or more specific locations or portions that are deflected towards or away from the nominal free shape to a greater or lesser degree than the remainder of the bearing element. To achieve this controlled deflection, the bearing element is thin enough to permit bending under working loads, but not so thin as to allow material yield or fatigue cracking, or to exceed the endurance limit of the material. The deflection is opposed by the elasticity of the bearing element in bending, as well as hoop stresses in the bearing feature. The bearing could also be designed to allow some controlled plastic deflection. As used herein, the term "conform" or "conformal" implies a level of flexibility typical of a polymeric or elastomeric material.

The general principles described above are applicable to numerous physical configurations, several exemplary embodiments of which will be described in more detail below, with reference, to the drawings wherein identical reference numerals denote the same elements throughout the various views.

FIGS. 1-4 illustrate a bearing assembly 100 comprising outer and inner members 102 and 104. The outer member 102 is an element with a bore 106 (a cylindrical bore in this case) defining a first contact surface 108, and the second member 104 is a shaft defining a second contact surface 110, passing through the bore 106. In the illustrated example the inner member 104 is hollow, but it could have a solid central cross-section. This example would be representative of the housing of an industrial valve and the shaft or stem of the valve (where the valve stem can rotate and/or translate relative to the housing.) The inner member 104 can rotate about and translate parallel to its own longitudinal central axis, relative to the outer member 102.

Figure 1:
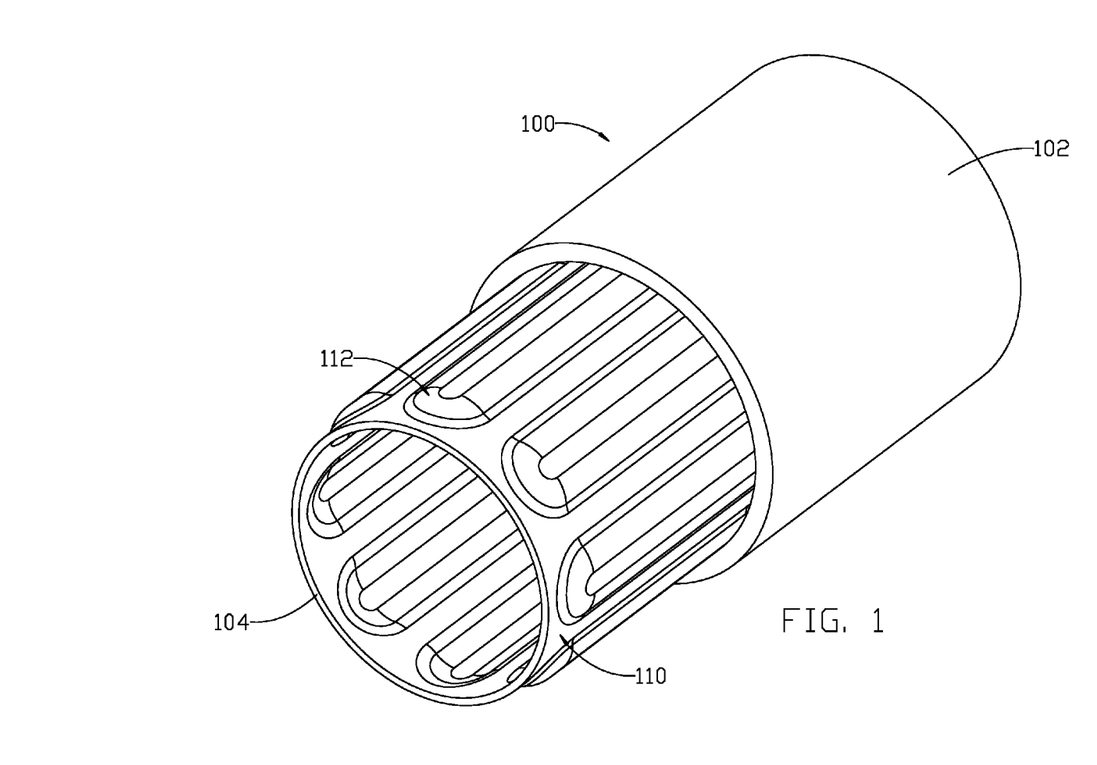
FIG. 1 is a perspective, partially-exploded view of a bearing assembly constructed in accordance with an aspect of the present invention.
Figure 2:
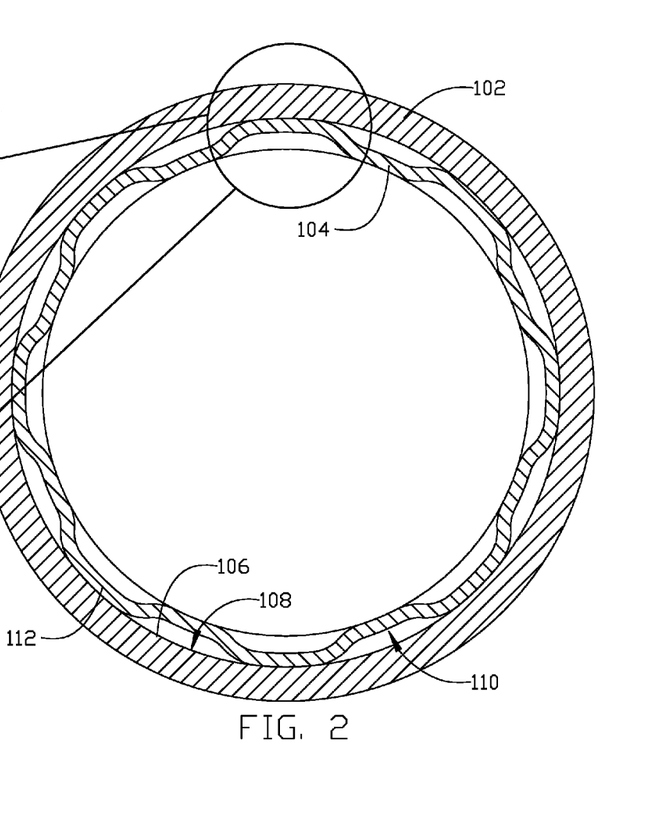
FIG. 2 is a cross-sectional view of the bearing assembly of FIG. 1.

In the illustrated example the inner member 104 incorporates a plurality of protruding bearing elements 112. The bearing elements 112 are formed as an annular array of longitudinally-extending ridges with convex-rounded ends. The bearing elements 112 "protrude" in the sense that they extend radially outward beyond adjacent portions of the second contact surface 110. The second contact surface 110 thus includes both recesses and protruding portions, and effectively during use only the protruding portions would bear against the opposing first contact surface 108 of the outer member 102. For each bearing element 112, the cross-sectional shape can be conceptualized as including a raised central portion 112A flanked by a pair of beam portions 112B. The beam portions 112B couple the central portion 112A to the remainder of the second contact surface 110. The term "beam portion" refers to a structure which is loaded in bending, similar to a conventional structural beam. This cross-sectional configuration is common to all of the bearing elements described herein.

The bearing elements 112 are constructed from a rigid material as described above, and the second contact surface 110 is wear-resistant as described above. In the configuration shown in FIG. 3, the portion of the second contact surface 110 at the peaks of the bearing elements 112 is convex. The cross-sectional profile of the bearing elements 112 may be flat or curved as necessary to suit a particular application. When viewed in half-sectional profile, the bearing elements 112 are arcuate, such that contact between them and the outer member 102 tends to cause bending deflection of the bearing elements 112.

The outer member 102 is also made from a rigid material, and the first contact surface 108 is wear-resistant as described above. When assembled, the contact surfaces 108 and 110 bear directly against each other so as to transfer mechanical loads between the outer and inner members 102 and 104 while allowing relative sliding motion between the contact surfaces (and thus, relative sliding or rotation between the first and second members 102 and 104). The contact surfaces 108 and 110 are wear-resistant as described above.

The bearing elements 112 may be sized relative to the outer member 102 such that there is some degree of static deflection or "preload" in the bearing elements 112 when the outer and inner members 102 and 104 are statically assembled, or there may be some radial clearance between the two when statically assembled.

In practice it is impossible to achieve surface profiles completely free of minor imperfections and variations. If the bearing elements 112 and the outer member 102 were both completely rigid, this would cause high Hertzian contact stresses and rapid wear. Accordingly, an important feature of the illustrated assembly 100 is that the bearing elements 112 and thus the second contact surface 110 is conformable to the opposing first contact surface 108, as described above. In the case were the inner member 104 were to have a solid cross-section, the bearing elements 112 would be incorporated as part of a separate sleeve surrounding the solid inner core, so as to provide the needed flexibility for the bearing elements 112.

Figure 3:
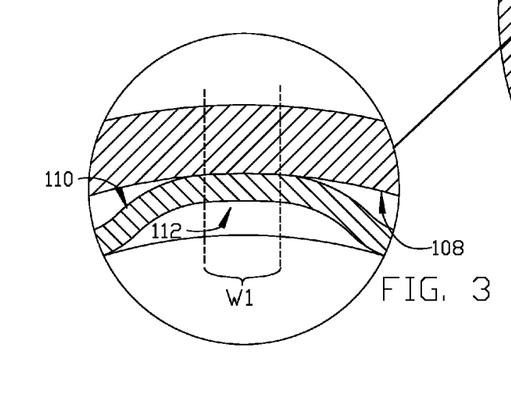
FIG. 3 is an enlarged view of a portion of the bearing assembly of FIG. 1, in a first condition.
Figure 4:
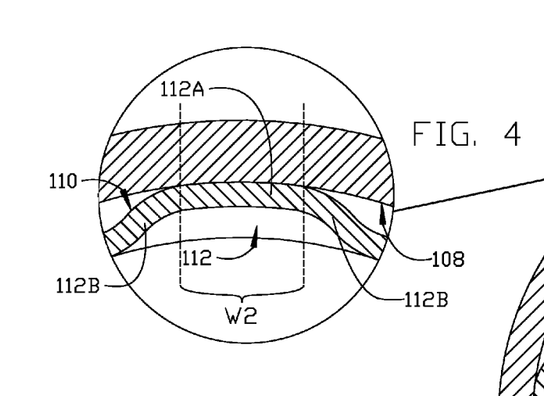
FIG. 4 is an enlarged view of a portion of the bearing assembly of FIG. 1, in a second condition.

FIG. 3 shows a cross-sectional view of one of the bearing elements 112 in an initial condition. It can be seen that the second contact surface 110 bears against the first contact surface 108 of the outer member 102, creating a contact region or band of first width "W1". FIG. 4 shows the bearing element 112 in a position after wear (or under a loaded condition), resulting in a substantially increased contact surface area width "W2" between the contact surfaces 108 and 110.). This increases contact area and therefore decreases contact stress for a given load. As described above, the bearing element 112 can conform to the imperfect contact surface 108 and deflect in an irregular shape. The bearing element 112 is sized to achieve this controlled deflection as described above.

Figure 5:
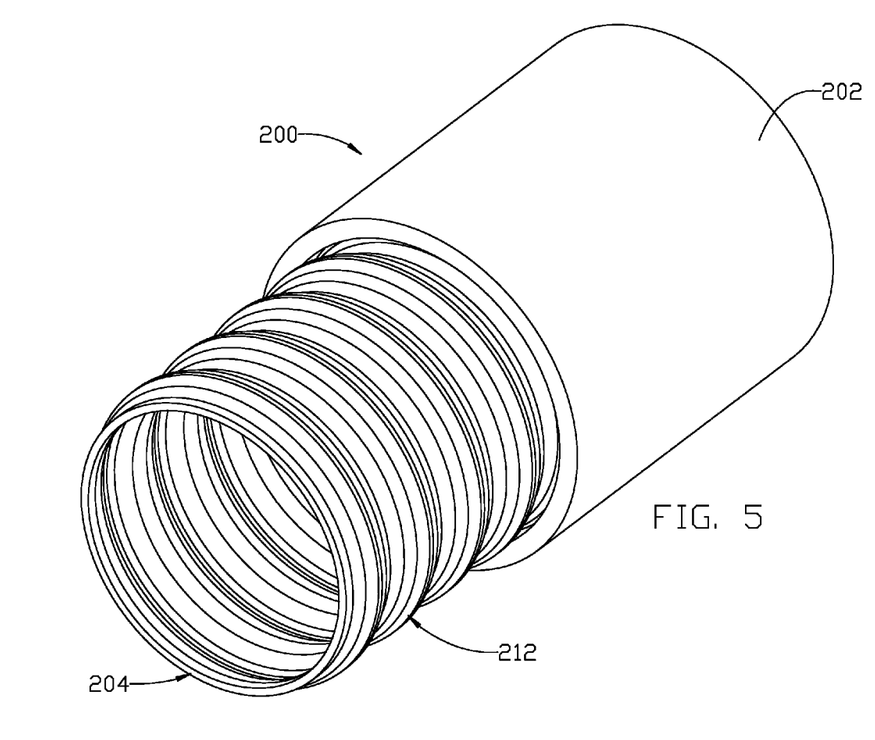
FIG. 5 is perspective, partially-exploded view of an alternative bearing assembly.
Figure 6:
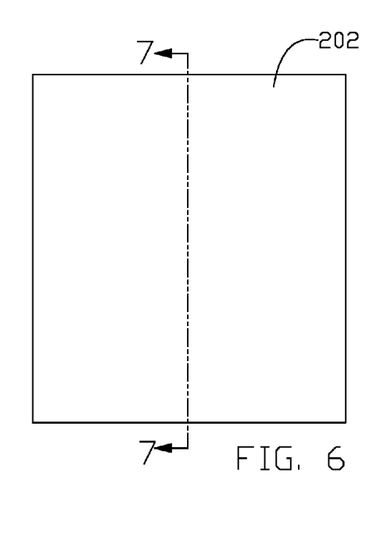
FIG. 6 is a side view of the bearing assembly of FIG. 5.
Figure 7:
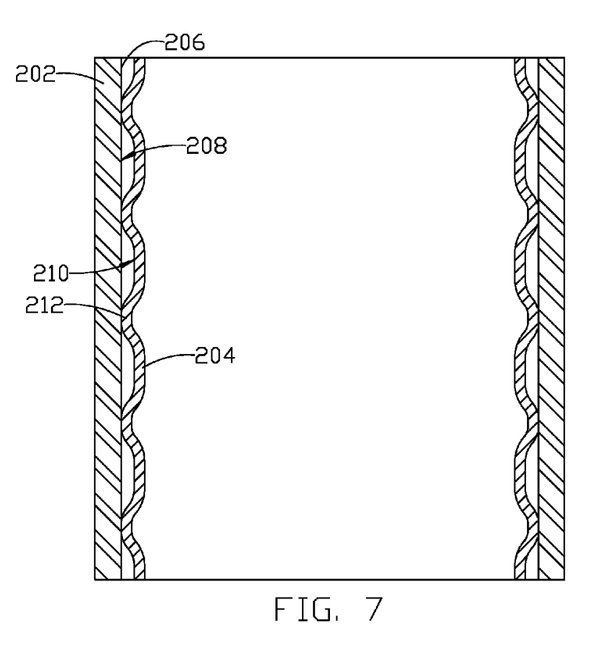
FIG. 7 is a cross-sectional view of the bearing assembly of FIG. 6.

FIGS. 5-7 illustrate an alternative assembly 200 which is similar in construction to the bearing assembly 100 described above and includes outer and inner members 202 and 204. The outer member 202 is an element with a bore 206 defining a first contact surface 208, and the inner member 204 is a shaft defining a second contact surface 210, passing through the bore 206. In the illustrated example the inner member 204 is hollow, but it could have a solid central cross-section. The inner member 204 can rotate about and translate parallel to its own longitudinal central axis, relative to the outer member 202.

The inner member 204 incorporates a plurality of protruding bearing elements 212. The bearing elements 212 are formed in a longitudinal array of circumferentially-extending ridges. The bearing elements 212 are constructed from a rigid material as described above, and the second contact surface 210 is wear-resistant as described above. In the illustrated configuration, the portion of the second contact surface 210 at the peaks of the bearing elements 212 is convex. The cross-sectional profile of the bearing elements 212 may be flat or curved as necessary to suit a particular application. When viewed in half-sectional profile, the bearing elements 112 are arcuate, such that contact between them and the outer member 102 tends to cause bending deflection of the bearing elements 212.

The outer member 202 is also made from a rigid material, and the first contact surface 208 is wear-resistant as described above. The contact surfaces 208 and 210 are wear-resistant as described above. When assembled, the contact surfaces 208 and 210 bear directly against each other so as to transfer mechanical loads between the outer and inner members 202 and 204 while allowing relative sliding motion between the contact surfaces (and thus, relative sliding or rotation between the first and second members 202 and 204).

The bearing elements 212 (and thus the second contact surface 210) are conformable to the opposing first contact surface 208, as described above. In the case were the inner member 204 were to have a solid cross-section, the bearing elements 212 would be incorporated as part of a separate sleeve surrounding the solid inner core, so as to provide the needed flexibility for the bearing elements 212.

The bearing elements 212 may be sized relative to the outer member 202 such that there is some degree of static deflection or "preload" in the bearing elements 212 when the outer and inner members 202 and 204 are statically assembled, or there may be some radial clearance between the two when statically assembled.

Figure 8:
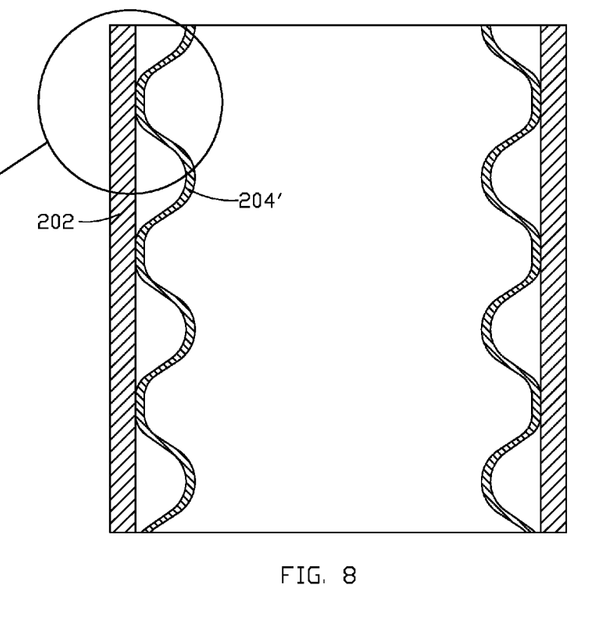
FIG. 8 is a cross-sectional view of an alternative bearing assembly.
Figure 9:
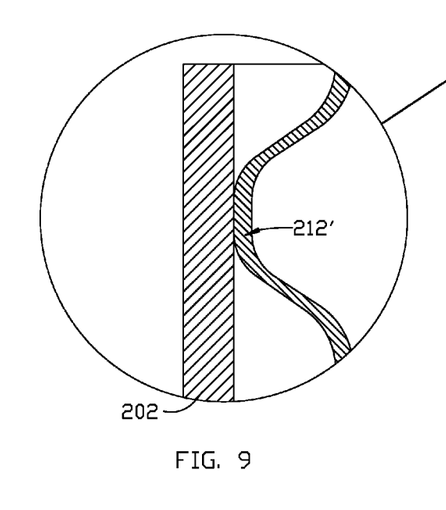
FIG. 9 is an enlarged view of a portion of the bearing assembly of FIG. 8.
Figure 10:
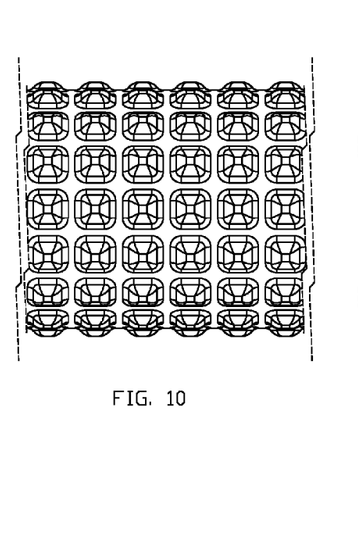
FIG. 10 is a side view of an inner member, showing a pattern of bearing elements.
Figure 11:
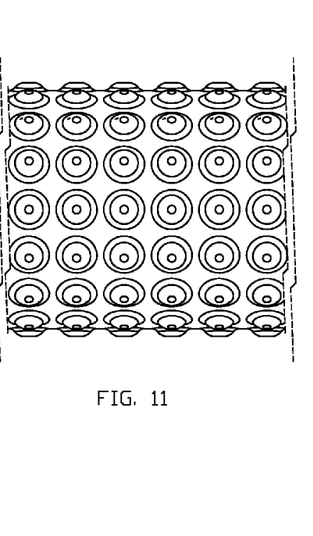
FIG. 11 is a side view of an inner member, showing a pattern of bearing elements.
Figure 12:
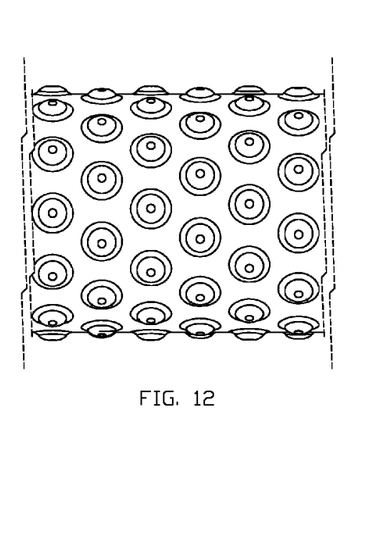
FIG. 12 is a side view of an inner member, showing a pattern of bearing elements.
Figure 13:
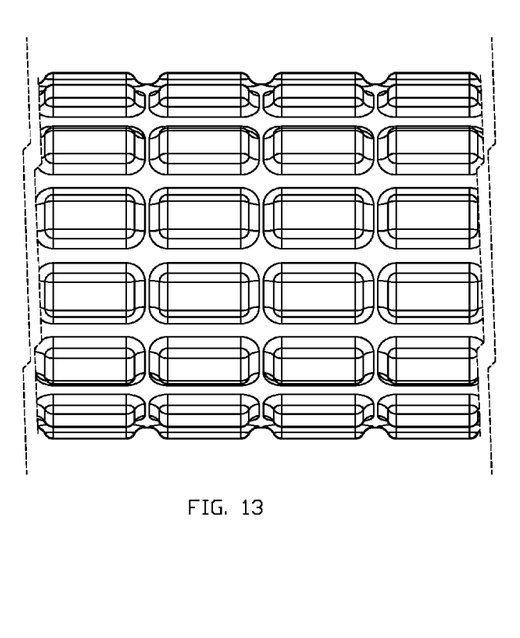
FIG. 13 is a side view of an inner member, showing a pattern of bearing elements.
Figure 14:
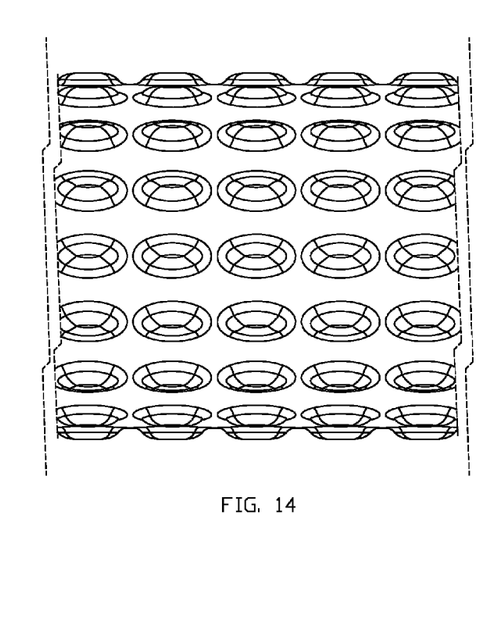
FIG. 14 is a side view of an inner member, showing a pattern of bearing elements.

FIGS. 8 and 9 show an inner member 204' illustrating the concept that the wall thickness of the inner member 204' can be selectively varied to tailor the characteristics of bearing elements 212' to a particular application.

FIGS. 10-14 depict several variants of inner members similar in design to the inner member 104 described above, but having the bearing element arranged in as arrays of individual "islands". In plan view the bearing elements may be square, circular, rectangular, or oval, as desired to adapt them to various applications.

Figure 15:
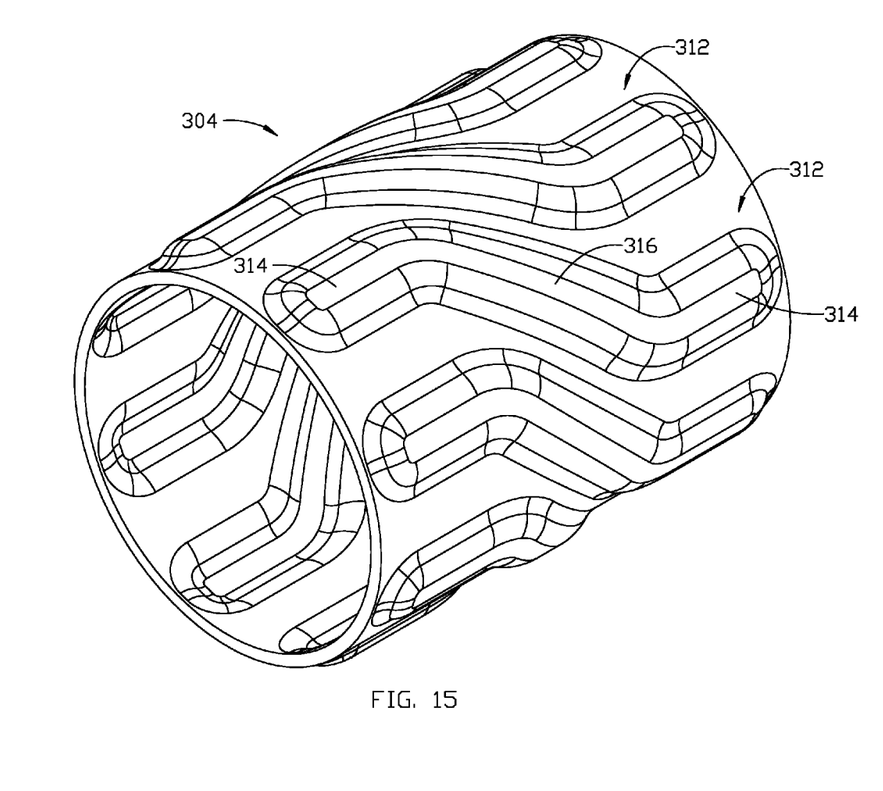
FIG. 15 is a perspective view of an inner member, showing a pattern of bearing elements.

FIG. 15 illustrates an alternative inner member 304 generally similar in construction to the inner member 104 described above. It incorporates a plurality of protruding bearing elements 312. The bearing elements 312 are formed as an annular array of ridges with convex-rounded ends. Each bearing element 312 has an elongated "Z"-shape with axially-extending end segments 314 circumferentially offset from each other and interconnected by an oblique central segment 316. The bearing elements 312 are constructed from a rigid material as described above with a contact surface that is wear-resistant as described above, and are conformal as described above. This configuration of bearing elements 312 may be used when the expected motion is a combination of translation and rotation.

Figure 16:
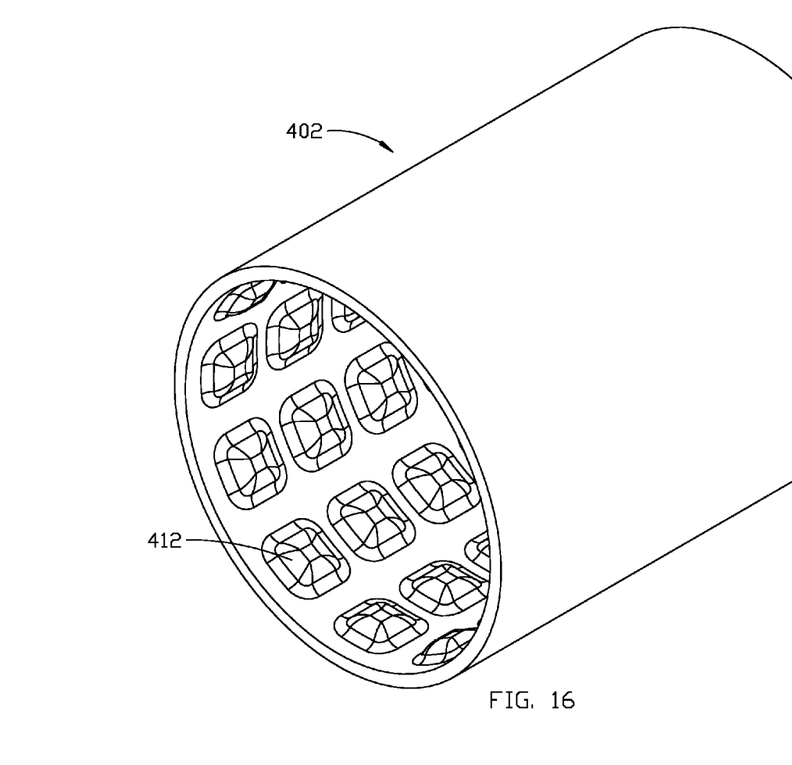
FIG. 16 is a perspective view of an outer member, showing a pattern of bearing elements.

FIG. 16 illustrates an alternative outer member 402 generally similar in construction to the inner member 202 described above. It incorporates a plurality of bearing elements 412 that protrude inward. This configuration would be used in conjunction with an inner member (not shown) having a plain outer contact surface without bearing elements. As illustrated the bearing elements 412 are formed as an array of individual "islands", but any of the configurations described above could be used. The bearing elements 412 are constructed from a rigid material as described above with a contact surface is wear-resistant as described above, and are conformal as described above.

Figure 17:
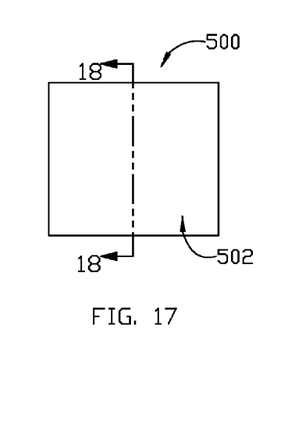
FIG. 17 is a side view of an alternative bearing assembly.
Figure 18:
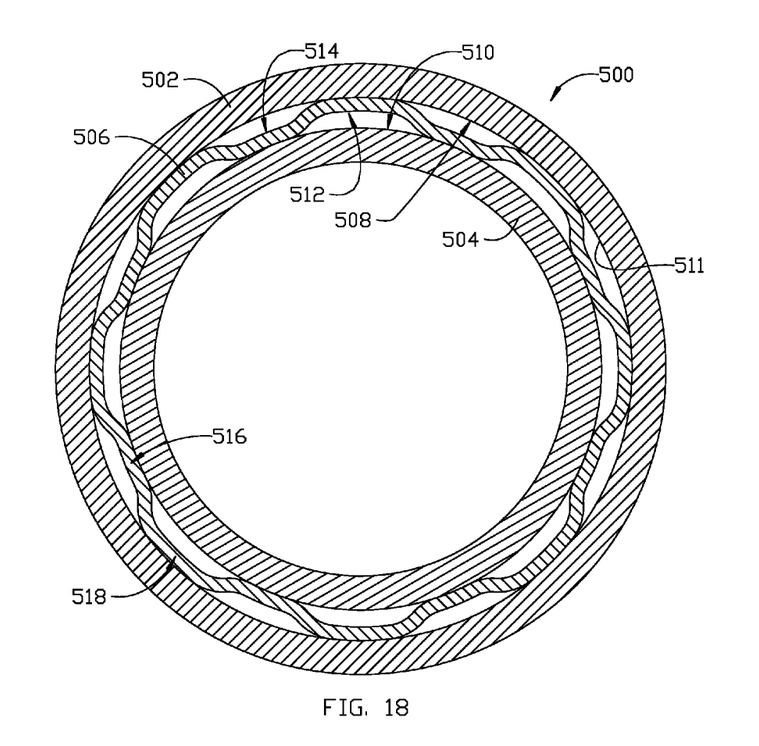
FIG. 18 is a cross-sectional view of the bearing assembly of FIG. 17.

FIGS. 17 and 18 illustrate a bearing assembly 500 comprising outer and inner members 502 and 504, with an intermediate member 506 disposed therebetween. The outer member 502 is an element with a bore 511 (a cylindrical bore in this case) defining a first contact surface 508, and the inner member 504 is a shaft defining a second contact surface 510. In the illustrated example the inner member 504 is hollow, but it could have a solid central cross-section. The inner member 504 can rotate about and translate parallel to its own longitudinal central axis, relative to the outer member 502. The outer and inner members 502 and 504 are made from rigid materials, and their contact surfaces are wear-resistant as described above.

The intermediate member 506 is annular and has opposed third and fourth contact surfaces 512 and 514, respectively. The third contact surface 512 bears against the second contact surface 510, and the fourth contact surface 514 bears against the first contact surface 508. The intermediate member incorporates a plurality of inner bearing elements 516 protruding from the third contact surface 512, and a plurality of outer bearing elements 518 protruding from the fourth contact surface 514. The inner and outer bearing elements 516 and 518 are formed as an annular array of longitudinally-extending ridges with convex-rounded ends. As shown in FIG. 18, the backside of each of the inner bearing element 516 may form the recessed portion or "valley" between adjacent outer bearing elements 518, and vice-versa. The third and fourth contact surfaces 512 and 514 thus include both recesses and protruding portions, and effectively during use only the protruding portions would bear against the opposing first contact surface 508 of the outer member 502 and the second contact surface 510 of the inner member 504, respectively.

The intermediate member 506 is constructed from a rigid material as described above, and its contact surfaces 512 and 514 are wear-resistant as described above. The contact surfaces of each bearing interface of the assembly 500 (that is, each location where two contact surfaces meet) are wear-resistant. The cross-sectional profile of the bearing elements 516 and 518 may be flat or curved as necessary to suit a particular application. When viewed in half-sectional profile, the bearing elements 516 and 518 are arcuate, such that contact between them and the inner and outer members 504 and 502 tends to cause bending deflection of the bearing elements 516 and 518. The bearing elements 516 and 518 are conformal as described above.

Figure 19:
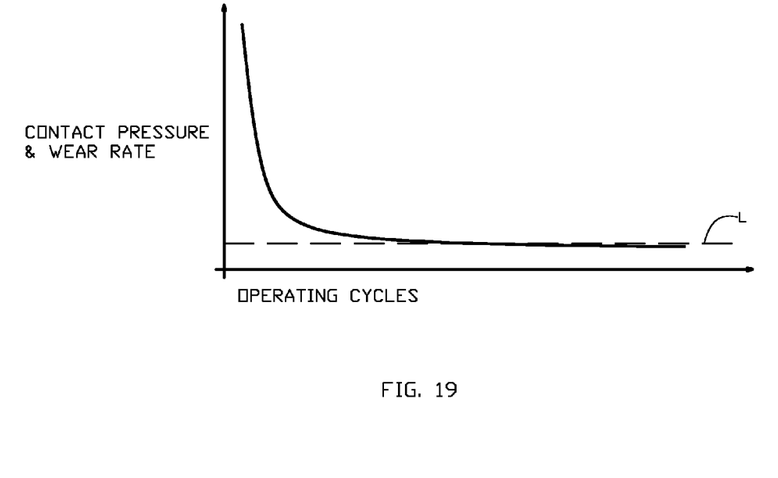
FIG. 19 is a chart showing a wear characteristic of a bearing assembly of the present invention.

Optionally, any of the bearing assemblies described above may be designed in conjunction with the opposing contact surface to create a wear characteristic that is constantly diminishing (similar to an asymptotic characteristic). For example, considering the bearing elements 112 (shown generally in FIG. 2), in FIG. 3 the initial assembled condition is shown. When assembled and placed under load, the interface (contact region) between each of the contact surfaces 108 and 110 will have a characteristic width denoted "W1". The initial dimensions of the bearing element 112 are selected such that, even using wear-resistant surfaces or coatings, some wear takes place during an initial wear-in period of movement cycles. in this situation, the wear-resistant surface may function as a sacrificial element to some degree. For example, some of the initial thickness of a coating or thin film could wear away. As a result, the contact band width increases during the initial wear-in period to a second, larger value "W2" (seen in FIG. 4). This increases contact area and therefore decreases contact stress for a given load. After the initial wear-in period (which could occur before the assembly is placed into its end use), the contact band reaches a post wear-in width at which the contact stress is below a selected limit, below which the rate of wear in the contacting surfaces approaches a very low number or zero, consistent with a long life of the bearing assembly 100. FIG. 19 illustrates this wear characteristic, with the limit "L" depicted as a horizontal line.

It is noted that the increase in contact band or contact region area (e.g. as shown in FIGS. 3 to 4) can occur as a result of changes in loading or from initial wear-in, or from a combination of both loading and wear-in.

The configuration of the bearing element 112 is important in developing the constantly diminishing wear characteristics described above. In particular, the bearing element 112 may be sized and shaped so that deflections of the contact surface 110 under varying loads is always essentially normal to its tangent point on the opposing contact surface 108, as the bearing element 112 is loaded and unloaded. This ensures that the centroid of the contact region on the bearing element 112 remains constant.

As noted above, known coatings such as STELLITE, tungsten carbide, titanium nitride, chrome plating, carbon thin films, and/or diamond-like carbon coatings may be used to impart wear resistance or augment the wear resistance of any of the contact surfaces described above. To the same end, it may be desirable to surface treat either or both interfaces of any of the above-described contact surfaces with a laser, shot peen, burnishing, or water shock process, to impart residual compressive stresses and reduce wear. The benefit could be as much from surface annealing and microstructure and microfracture elimination as smoothing itself.

The foregoing has described a bearing assembly with wear-resistant properties and conformable geometries. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:
1. A bearing apparatus, comprising:
(a) a first member comprising a rigid material and having an internal bore defining a first contact surface;
(b) a second member disposed in the internal bore of the first member, the second member comprising a rigid material and having an outer cylindrical surface defining a second contact surface;
(c) wherein both contact surfaces are wear-resistant, and wherein the first and second members are positioned relative to each other by a plurality of protruding bearing elements, so as to transfer mechanical loads between the first and second members, while allowing relative translation and/or rotation between the first and second members, wherein each bearing element includes a raised central portion flanked by a pair of beam portions;
(d) wherein: (i) the plurality of protruding bearing elements that bear against the second contact surface are formed in the first contact surface; or (ii) the plurality of protruding bearing elements that bear against the first contact surface are formed in the second contact surface; and
(e) wherein the protruding bearing elements are shaped and sized so as to deform elastically and conform in an irregular shape to the corresponding one of the contact surfaces.
2. The apparatus of claim 1 wherein the protruding bearing elements comprise longitudinally-extending ridges.

3. The apparatus of claim 1 wherein the protruding bearing elements comprise circumferentially-extending ridges.

4. The apparatus of claim 1 wherein the protruding bearing elements comprise an array of individual elements.

5. The apparatus of claim 1, wherein both contact surfaces are ceramic, metallic, or a combination thereof.

6. The apparatus of claim 1, wherein the bearing elements are sized so as to permit elastic deflection of the bearing elements while limiting stresses in the bearing elements to less than the endurance limit of the material, when a predetermined load is applied to the apparatus.

7. The apparatus of claim 1 wherein the bearing elements and the first and second contact surfaces are configured to produce an asymptotic wear characteristic when in use.

8. The apparatus of claim 1 wherein the bearing elements are configured to produce a varying area contact region in response to changes in load acting on the apparatus.

9. The apparatus of claim 1 wherein the bearing elements are made from a material more rigid than both elastomers and polymers.

10. The apparatus of claim 1 wherein at least one of the first member, the second member, and the bearing elements has a wear-resistant coating disposed thereon.

11. The apparatus of claim 1 wherein the bearing elements are configured to define a contact region one of the first and second contact surfaces, such that a centroid of the contact region remains stationary in response to changes in mechanical and/or fluid pressure on the apparatus.

* * * * *